Feb. 11, 1930.   W. F. OSBORNE   1,746,791
FLUID TESTING DEVICE AND APPARATUS
Filed July 18, 1921   5 Sheets-Sheet 1
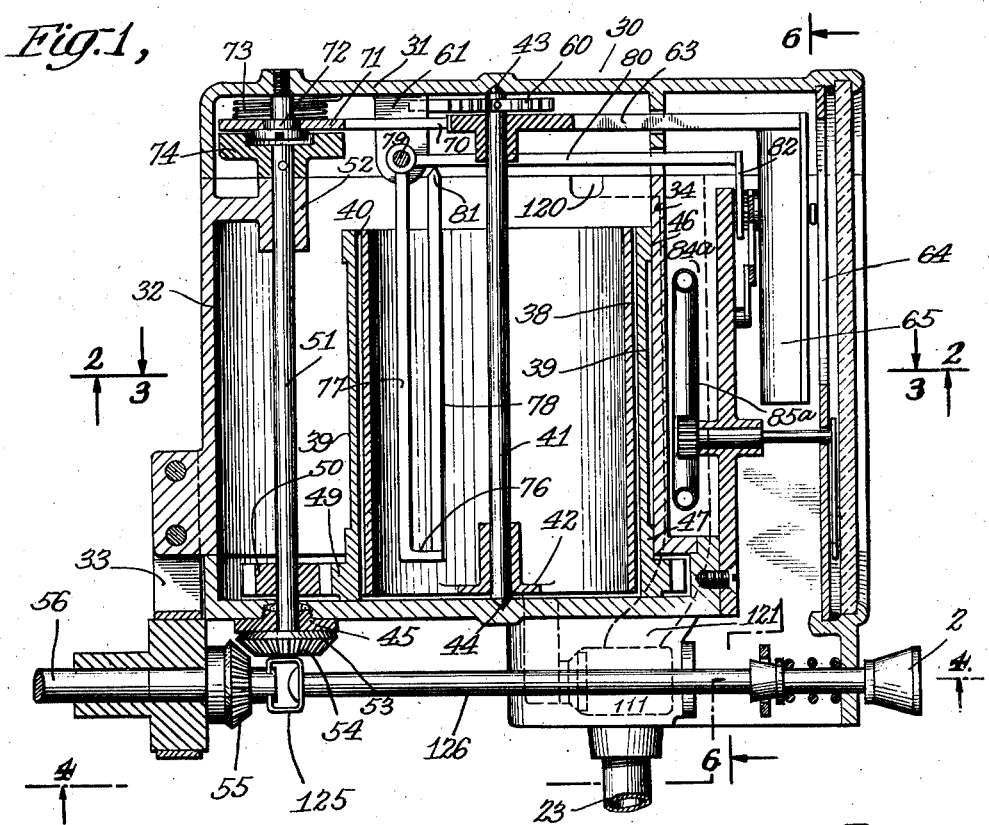
Fig. 1,
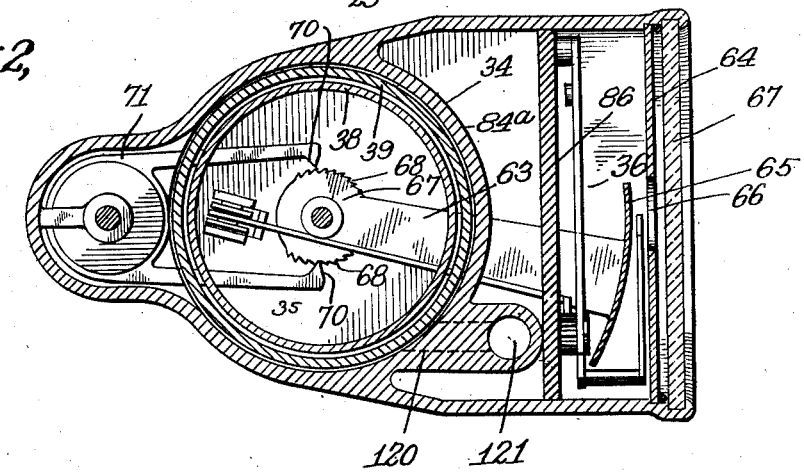
Fig. 2,
Inventor
William F. Osborne
By their Attorney

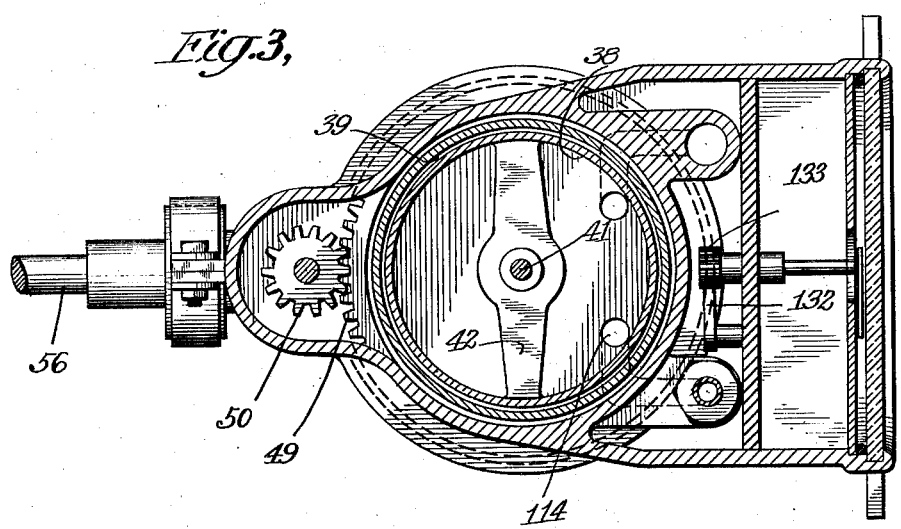
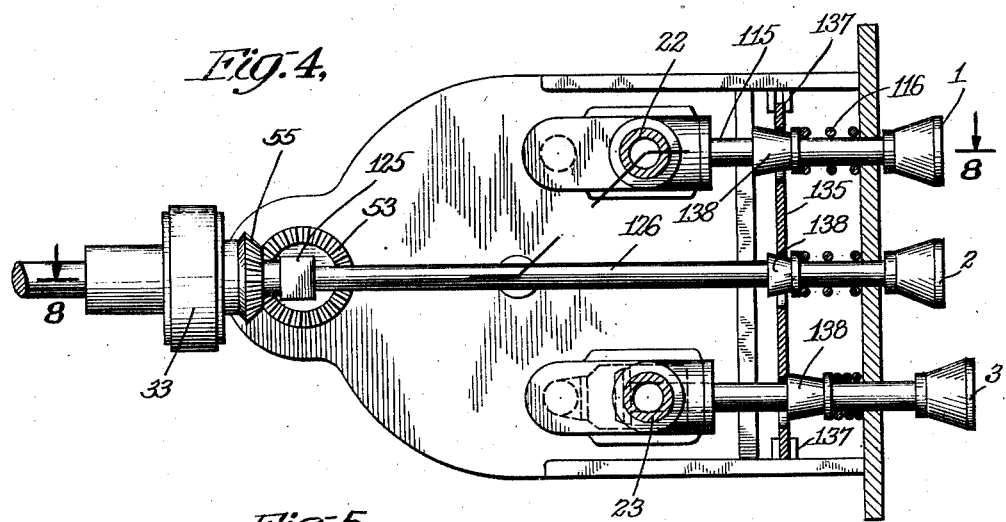
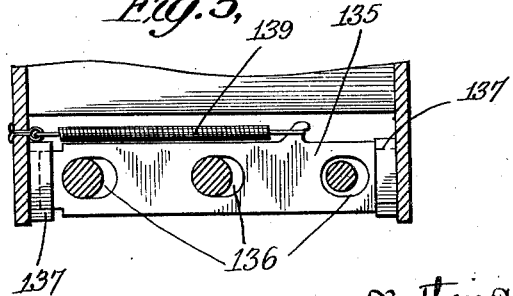

Feb. 11, 1930.  W. F. OSBORNE  1,746,791
FLUID TESTING DEVICE AND APPARATUS
Filed July 18, 1921  5 Sheets-Sheet 3
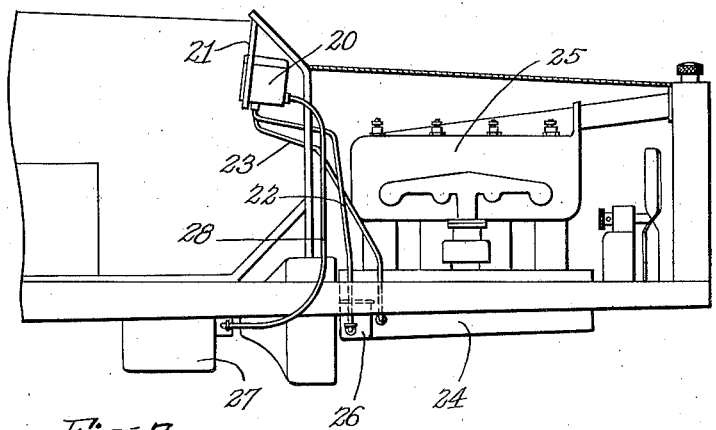
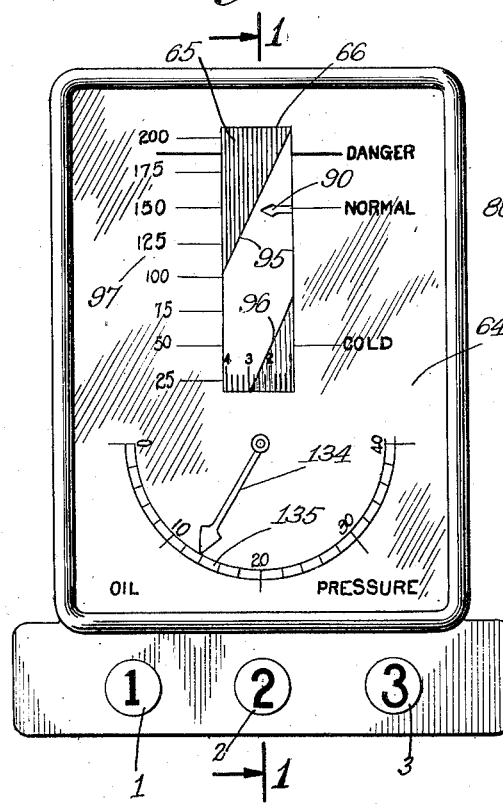
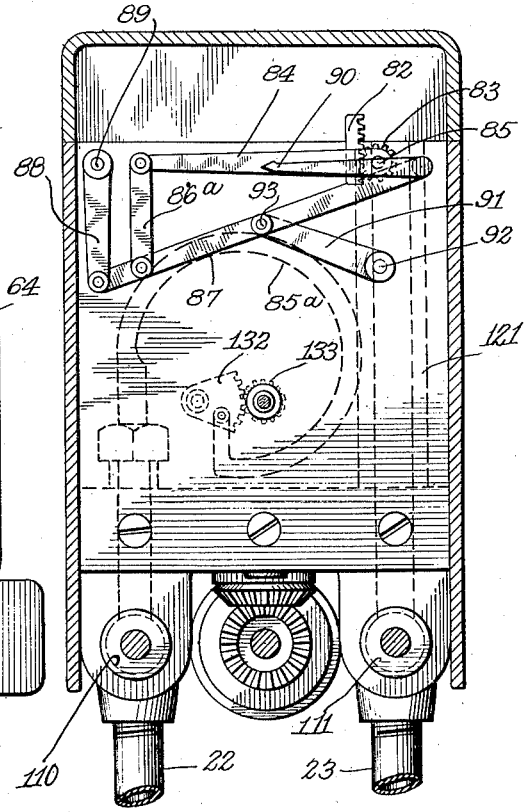

Feb. 11, 1930.  W. F. OSBORNE  1,746,791
FLUID TESTING DEVICE AND APPARATUS
Filed July 18, 1921  5 Sheets-Sheet 4
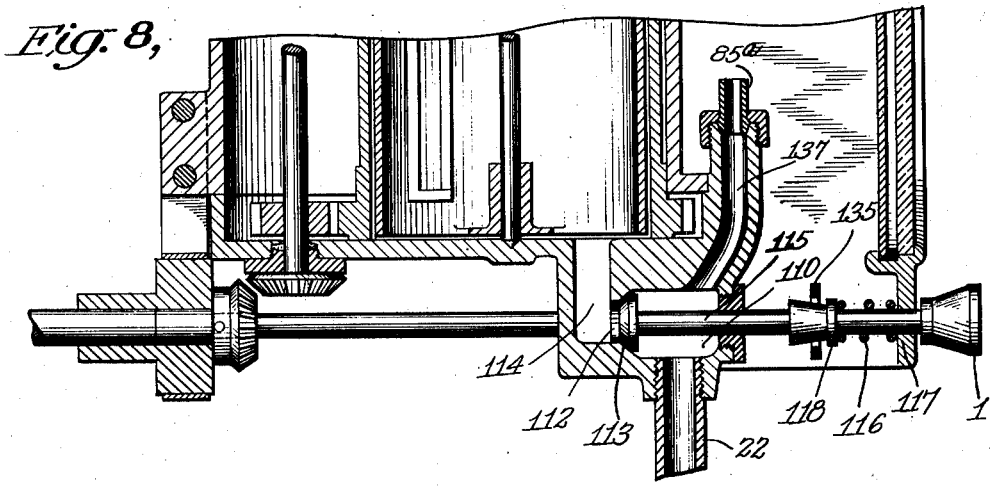
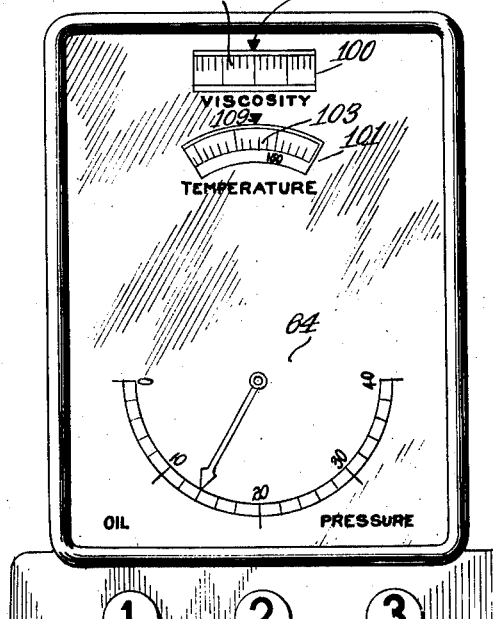
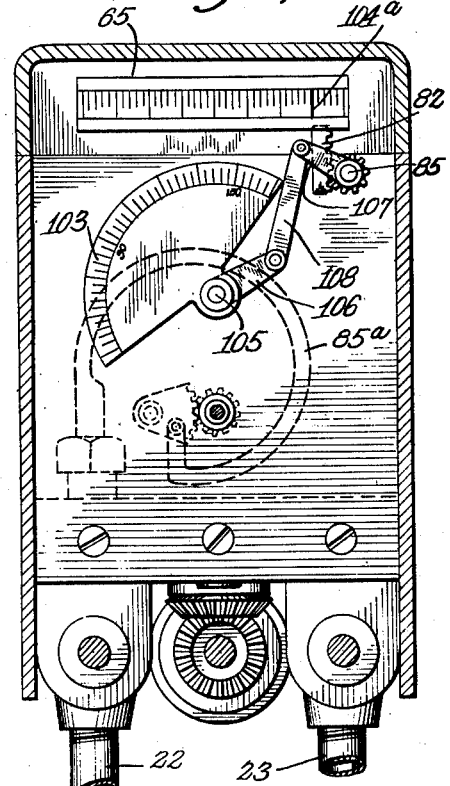

Feb. 11, 1930. W. F. OSBORNE 1,746,791
FLUID TESTING DEVICE AND APPARATUS
Filed July 18, 1921 5 Sheets-Sheet 5
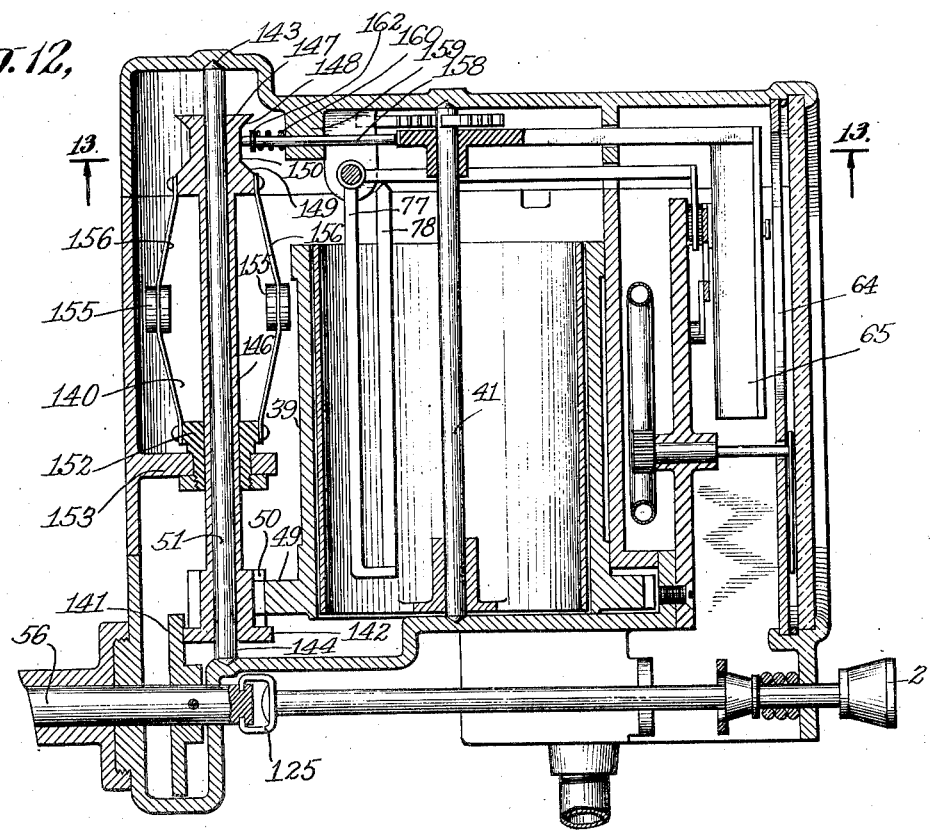
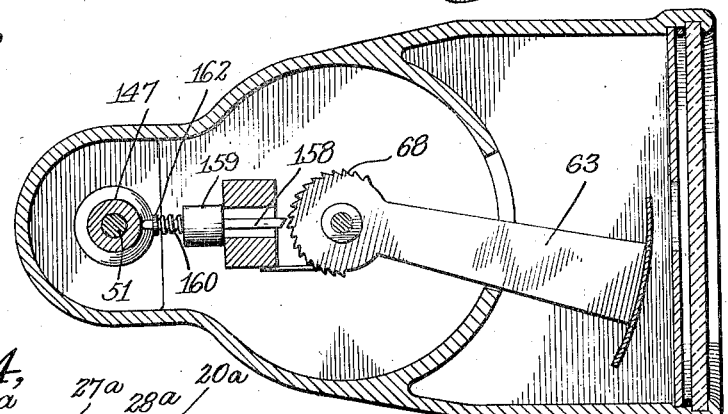
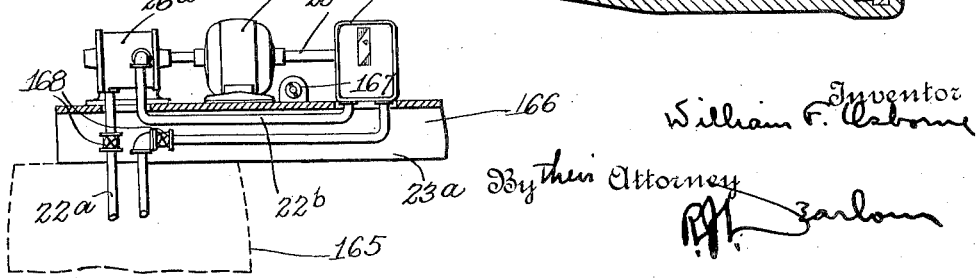
William F. Osborne, Inventor
By their Attorney Patented Feb. 11, 1930

1,746,791

UNITED STATES PATENT OFFICE

WILLIAM F. OSBORNE, OF WESTWOOD, NEW JERSEY

FLUID-TESTING DEVICE AND APPARATUS

Application filed July 18, 1921. Serial No. 485,729.

My invention relates to fluid testing devices and apparatus, and it has special reference to the determination of properties and conditions of oil and other fluids, such for example as viscosity, temperature and pressure.

One of the objects of the present invention is to improve and simplify the construction and operation of devices and apparatus of this general class, and to provide a device which shall be simple, compact and durable in construction, reliable and accurate in operation, and particularly adapted for expeditious and easy manipulation by the operator.

Another object is to provide a viscosity testing device of the torsion-type which shall be constructed and arranged to maintain the fluid being tested in a thin film during the determination of its viscosity, instead of operating upon a relatively large volume or body of fluid as has been done heretofore in the art. In this way, materially greater sensitiveness and accuracy are secured by reason of the elimination to a negligible degree of the disturbing factors of density, centrifugal force, turbulence and so-called "end effects" which are common to other devices of the torsion-type and which impair the accuracy thereof.

Another object is to provide such a device which shall be so constructed as to permit of concurrent determinations of the viscosity and of the temperature of the fluid itself.

A further object of the invention is to provide an apparatus for measuring or indicating directly the absolute viscosity of a fluid. The formula for absolute viscosity is,—

$$\text{Absolute viscosity} = \frac{\text{force} \times \text{film thickness}}{\text{area} \times \text{velocity}}$$

and in an apparatus for measuring or indicating the absolute viscosities of different fluids, it is necessary to maintain certain conditions constant. Accordingly, the apparatus of the present invention is so constructed and arranged that the film thickness of the fluid under test, the area subjected to shear, and the velocity of the rotating member are maintained constant. The force required is then the only variable factor and depends upon the viscosity of the fluid under test.

A further object of the present invention is to provide a testing apparatus through which the fluid may be continuously circulated during its operation.

A still further object is to provide a self-contained unitary instrument which shall indicate both the viscosity and temperature of the fluid at closely adjacent positions, and, moreover, to exhibit in cooperative relation with these viscosity and temperature indications, a predetermined standard viscosity-temperature curve or curves to which the indications may be referred for purposes of ready comparison.

In a more limited aspect, an object of the invention is to provide a portable viscosity testing set which may be conveniently utilized to test the contents of tanks, or other receptacles, wherever they may be located, and which is adapted to continuously pump fluid from the receptacle into and through the viscosimeter, where it is tested and thence returned to the receptacle.

More specifically, a further object is to provide a testing apparatus especially adapted for use in an automobile for determining the exact conditon of the engine lubricating oil during actual operating conditions, although the invention is applicable for use in connection with circulating lubricating systems for any type of engine, machine, or the like, or in fact, in connection with any system in which fluid of any character is circulated.

With these and other objects in view, the present invention embodies a fluid container for the oil to be tested in which are disposed and immersed in the fluid a plurality of hollow cylindrical members which are preferably open at both ends and disposed the one within the other in approximate concentric relation so as to maintain a relatively thin film of fluid between them. One of the members is rotated at a substantially constant speed and, through the frictional resistance of the interposed fluid film, effects a rotative movement of the other member in opposition to a force created by a spring or the like, whereby the deflection of the second member is responsive to and dependent upon the viscosity of the fluid film. This deflection is rendered available for convenient observation through the agency of a suitable indicating mechanism which may be provided with, or may co-operate with, a suitable scale to enable the viscosity to be read directly. The utilization of a thin film of fluid to be tested is of particular importance and, for very exact measurements, the use of open-ended co-operating cylindrical members is also desirable. With this construction and arrangement of parts, extreme accuracy and sensitiveness of the instrument may be secured inasmuch as the effects of density, centrifugal force, turbulence and also so-called "end effects", inherent in torsion-type devices of the prior art, may be eliminated for practical purposes.

Another feature of the invention resides in the construction and arrangement of parts just described, which permit the introduction of a temperature measuring device within the inner cylindrical member, where it is immersed in the fluid itself, thereby permitting the determination of the actual temperature of the fluid at the time of, and without interfering with, the viscosity measurement. So far as we are aware, in the instruments of the prior art, it is either necessary to take the temperature of the fluid before the viscosity thereof is measured, or only an approximate determination of the fluid temperature is obtained, by taking the actual temperature of the surrounding bath.

Another feature of the invention contemplates the continuous circulation of the fluid to be tested through the instrument during its operation, which is secured by providing the fluid container with inlet and overflow openings whereby fluid may be continuously supplied and discharged while maintaining a substantially constant fluid level within the instrument, so that uniform conditions are insured.

Another feature of the invention embodies the use of visible indicating devices associated with the viscosity and temperature measuring mechanisms and so disposed as to present their indications to the observer at closely adjacent points. In conjunction with these indicating devices and carried by the device for indicating viscosity is a suitably formed plate or member bearing a standard or empirical viscosity-temperature curve or curves to which the indications of the instrument may be referred for purposes of comparison.

Still another and more specific feature of this invention resides in a unitary self-contained testing apparatus or set which may be conveniently carried from place to place, and which embodies a viscosity testing instrument, preferably of the type referred to, together with a suitable motor and pump by means of which fluid from any container may be wthdrawn, delivered to or continuously circulated through the instrument. With such an apparatus it becomes unnecessary to take samples of the fluid to the laboratory for testing purposes, and in lieu thereof the apparatus or set may be conveniently carried and utilized in connection with the original receptacle containing the fluid.

Another still more specific feature of the present invention, and particularly adapted for use in an automobile or other engine or machine provided with a circulating lubricating system, for the purpose of determining the properties of the lubricating oil under conditions of use, comprises an instrument, preferably of the type herein before referred to, which is connected to the lubricating system in such manner that the oil may be circulated through the instrument or at least may be delivered thereto, where its properties may be determined. When used upon an automobile the instrument is conveniently located on the meter board or dash within sight of the operator, and if a torsion-type of instrument of the character in question be utilized, a suitable flexible driving connection is provided for rotating one of the cylindrical members, and this driving connection receives its power from the gear set or other convenient source of power. In order that the operation of the instrument may be controlled by operator, a clutch is provided in the driving connection so that the instrument may be connected or disconnected from the source of power as desired. Furthermore, the oil connections to and from the instrument are provided with valves whereby the operator may control the supply and discharge of oil to and from the instrument. Although not essential, it is desirable to provide suitable interlocking mechanism associated with the several valves and with the driving connection clutch, so that the operation of either of the valves or the clutch by the operator insures a predetermined operation of the remaining controllable parts. In this way, proper operation of the instrument is definitely and automatically insured without thought on the part of the operator.

While the apparatus described in detail in the following description is not limited to the determination of absolute viscosity, it is nevertheless adapted for such determinations as will be fully set forth.

These and other objects of the invention and features by means of which they are attained, will be readily apparent to those skilled in the art from the following description of certain preferred embodiments of the invention illustrated in the accompanying drawings in which:—

Fig. 1 is a view, partially in section and partially in side elevation, of a testing device constructed in accordance with the invention.

Fig. 2 is a sectional view taken on the section line 2—2 of Fig. 1 and looking upwardly.

Fig. 3 is a sectional view taken on the section line 3—3 of Fig. 1 and looking downwardly.

Fig. 4 is a bottom plan view, partially in section on the section line 4—4 of Fig. 1.

Fig. 5 is a view in elevation of a portion of the interlocking mechanism shown in Fig. 4.

Fig. 6 is a view, partially in elevation and partially in section along the section line 6—6 of Fig. 1.

Fig. 7 is a view in elevation of the device, showing the face plate and indicating devices.

Fig. 8 is a partially sectional view taken along the section line 8—8 of Fig. 4.

Fig. 9 is a view in side elevation of a portion of an automobile equipped with testing apparatus embodying the present invention.

Figs. 10 and 11 are views corresponding to Fig. 7 and Fig. 6 respectively, but illustrating a modified form of indicating mechanism.

Fig. 12 is a view, partially in elevation and partially in section, of a further modification of the invention embodying an automatic speed regulating device.

Fig. 13 is a sectional bottom plan view along the section line 13—13 of Fig. 12 and Fig. 14 is a view in side elevation of a portable testing set or apparatus constituting a further modification of the invention.

In the drawings the invention is shown as designed especially for use on an automobile for testing the condition and properties of the engine lubricating oil, but it should be understood that this particular application of the invention is set forth merely as illustrative of one specific embodiment of the invention and as adapted for a particular use. Obviously, the invention is capable of more or less general utility for testing fluids of any character under a great variety of conditions and kinds of service, which may, or may not, render desirable certain modifications in the structural details and arrangement and location of parts, but which, nevertheless, embody the fundamental principles of construction and operation upon which the invention is based. For instance, the apparatus of the present invention is also intended and adapted for use as a laboratory instrument, in which case it probably would be found advantageous to simplify and rearrange the structure to some extent, although the apparatus as specifically illustrated could, of course, be utilized for this purpose. It is not deemed necessary or expedient to set forth the invention in many of the forms it may conveniently assume for different classes of service, and it should be understood that the invention is not in any sense restricted to the particular structure shown and described, and that many modifications may be made therein without departing from the spirit and scope of the invention.

Referring now to Figs. 1 to 9 inclusive, and especially to Fig. 9, the invention is, for illustrative purposes, shown as comprising, in general, a viscosimeter 20 conveniently disposed on a meter board 21 of an automobile, where it is accessible for operation and observation by the driver. The viscosimeter is connected by a supply pipe 22 and a discharge pipe 23 to a crank case 24 of the automobile engine 25, in such manner that the oil pump 26 for effecting the circulation of the oil through the engine lubricating system, may be utilized to supply oil to the viscosimeter or, if desired, to circulate oil therethrough, the oil being discharged or returned to the engine crank case by means of the discharge pipe 23. Inasmuch as the viscosimeter embodies certain rotatable parts as will hereinafter appear, which must be driven from a suitable source of power, these parts are conveniently connected to the usual gear set 27 by means of a suitable flexible driving connection 28.

The viscosimeter 20 comprises a case or container 30 for containing the fluid to be tested and for supporting and enveloping the various component parts of the device. The case 30 comprises three main parts,—a top member 31, an intermediate member 32 and a bottom member 33, which are suitably joined to form a unitary receptacle. Extending vertically through the case, substantially midway between its ends, is an integral wall 34, of cylindrical form, which divides the case into two compartments 35 and 36, the former being utilized to contain the fluid to be tested, together with certain parts of the mechanism which are immersed therein, and the latter for holding other parts of the mechanism by which the determinations of the instrument are visibly indicated.

Within the fluid compartment 35 are disposed a plurality of relatively rotatable hollow cylindrical members 38 and 39 which are disposed in approximate concentric relation, the one within the other. These members have their adjacent cylindrical surfaces or peripheries so positioned as to provide a narrow annular space 40 between them, which, during the operation of the instrument, is filled with a thin film of fluid to be tested, it being understood that the entire compartment 35 is filled under operating conditions, with fluid, in which the co-operating cylindrical members are entirely immersed. The inner cylindrical member 38 is mounted for rotative movement upon a spindle 41, by means of supporting arms 42 located at the bottom thereof. The spindle is provided with bearings 43 and 44 in the respective top and bottom walls of the casing. The outer cylindrical member rests upon the bottom wall of the casing at 45, and is provided with upper and lower annular bearing surfaces 46 and 47, which co-operate with the inner surfaces of the intermediate wall 34 and continuations thereof, for the purpose of definitely locating the cylindrical member, while permitting of free rotational movements.

During the operation of the instrument, the outer cylindrical member 39 is rotated continuously at a more or less constant speed by means of an annular gear 49 associated with its lower end, and which co-operates with a pinion 50 secured to a vertical shaft 51 having upper and lower bearing members 52 and 53 suitably associated with the casing. This shaft 51 projects through the bottom wall of the casing, being provided with a suitable stuffing box, and its lower end carries a bevel gear 54 that is adapted to be meshed with a cooperating bevel gear 55 secured to one end of a driving shaft 56, that either constitutes a part of the flexible driving connection 28 referred to in connection with Fig. 9, or is suitably connected to a source of power and rotated continuously thereby. It will be understood that the adjacent inner cylindrical member 38 will have rotative movements imparted thereto, by reason of the frictional resistance of the thin film of fluid interposed between said members, and these movements will depend upon and be responsive to the viscosity of the intermediate fluid film.

In order to render these movements of the inner cylindrical member available for indication and observation, a torsion spring 60 is attached to the upper end of the central spindle 41 and to a lug 61 depending from the upper wall of the casing. This spring, therefore, tends to oppose any rotative movement of the inner cylindrical member, thereby causing the deflection of said member to be a measure of the viscosity of the fluid being tested. This deflection is visibly indicated by means of suitable indicating mechanism comprising an arm 63 disposed above the fluid level and extending forwardly to a position immediately behind a face plate or dial 64, shown in front elevation in Fig. 7. The forward end of the arm 63 is provided with a curved plate or segment 65, which may be marked with suitable indicia, as will be hereinafter more fully set forth. The face plate 64 is provided with an opening 66 through which the markings of the segment 65 may be observed. A protecting plate 67 of suitable transparent material is provided in front of the face plate 64.

It will be understood that the amount of deflection of the inner cylindrical member 38, and therefore, the indication of the instrument will depend to some extent upon the speed of rotation of the outer cylindrical member 39, and, therefore, in order to secure proper and reliable readings or indications it is necessary to make suitable provision for insuring that the speed of operation be substantially constant, or at least be within reasonable limits. This may be accomplished in several ways and when the instrument is employed upon an automobile and driven from the gear set or other device operated by the engine, as already mentioned, it is prefered to employ a speed responsive device which shall be so constructed and arranged as to permit of the operation of the instrument only when the speed lies between two definitely fixed limits. Accordingly, the hub end 67 of the arm 63, is provided with a series of teeth 68, which are adapted to be engaged with one or the other of a pair of pawls 70. During such engagement, the inner cylindrical member and the indicating mechanism associated therewith, is locked against movement, and is permitted to operate only when the speed is such that neither of the pawls 70 are in locking contact with the teeth 68. These pawls 70 preferably constitute parts of a copper disc 71 that is pivotally mounted and suspended upon a bearing stud 72 depending from the upper wall of the casing. A torsion spring 73 surrounds the bearing stud 72 and its respective ends are secured to the casing and to the copper disc 71, whereby the disc is biased to a predetermined position. In close proximity to the copper disc 71 is a co-operating magnet 74 that is attached to the upper end of the shaft 51 and is rotated thereby in accordance with the rotational speed of the outer cylindrical member 39. With this arrangement of parts, electric currents are induced in the copper disc in accordance with the speed of rotation of the magnet 74 and an electro-magnetic drag is produced, tending to effect the rotation of the copper disc against the opposing force of the spring 73. The spring 73 is preliminarily adjusted so as to permit the disc to turn only when the speed of rotation of the magnet and consequently of the outer cylindrical member 39 reaches a predetermined rate. Therefore, when the rotational speed rises to this predetermined lower limit the copper disc 71 is rotated sufficiently to release the normally engaged pawl 70, thereby permitting the deflection of the inner cylindrical member in accordance with the viscosity of the fluid being tested. However, when the rotational speed exceeds a predetermined upper limit, the electro-magnetic drag upon the copper disc 71 is sufficient to turn the disc far enough to effect the engagement of the other pawl 70 with the teeth 68, whereupon further deflection of the inner cylinder and consequently further operation of the instrument is prevented. In operating the device upon an automobile, the operator soon learns by observation, the approximate speed under which tests should be made with this instrument, and he may, therefore, regulate the speed of his car to substantially the desired speed by casual observance of the usual speedometer.

In accordance with this invention, provision is also made for measuring the temperature of the fluid concurrent with the viscosity determination, a feature which is particularly important in securing accurate results, and which is rendered possible by the construction and arrangement of parts which permit of a suitable temperature measuring device being placed directly in the fluid container within the inner cylindrical member 38. Any suitable temperature measuring device may be employed but satisfactory results may be obtained by the use of a bimetal device 76, which comprises two bars 77 and 78 of different materials having different co-efficients of expansion and which are secured together at their lower ends. The bar 77 is suspended by its upper end upon a pin 79 carried by the lug 61, and this pin also serves as a pivot for a horizontal arm 80, which rests upon the upper pointed end 81 of the bar 78. The material of which the bar 78 is made has the greater coefficient of expansion, so that any change in temperature of the fluid contained within the instrument will effect greater expansions and contractions of the bar 78 than of the bar 77, thereby effecting a corresponding rise and fall of the horizontal arm 80. The free end of the arm 80 is provided with a vertical rack 82, which engages a pinion 83 which is fixed rigidly to an arm 84 and is provided with a pivot 85 projecting laterally from a plate 86. This plate 86 is fastened to the bottom part 33 of the casing and forms together with the intermediate wall 34, a compartment 84ª within which a suitable pressure gauge 85ª is disposed.

In order to multiply the vertical movements of the rack 82, the free end of the arm 84 is attached by means of a link 86ª to an arm 87, one end of which is pivotally connected to the lower end of a link 88 suspended from a pivot pin 89, and the other end of which carries a horizontally disposed pointer 90. A link 91 pivotally mounted on a pin 92 has a pivotal connection 93 with the arm 87 intermediate its ends, for the purpose of prescribing and limiting the movements thereof. The pointer which is located directly behind the face plate or dial 64, projects into the opening 66 thereof, where it may be readily observed.

In operating an automobile engine, it is of material importance to know the exact condition of the crank case or lubricating system oil for safe operation of the engine.

This suitability of the oil for use may be indicated by its viscosity which, of course, varies with the temperature and the degree of dilution of the oil by the motor fuel. For safe operation there is, therefore, a certain minimum allowable viscosity for each temperature beyond which the condition of the oil is too thin for service. Similarly, for each temperature there is a corresponding maximum allowable viscosity which, for safe operation, should not be exceeded. These two maximum and minimum allowable limits for each temperature may be indicated by predetermined arbitrary or standard curves between which the viscosity of the oil must be maintained for suitable or safe operation.

According to the present invention, the testing device is so constructed and arranged that such standard curves may be utilized in co-operative relation with the temperature indications so as to present to the driver or operator at a glance the relative condition or suitability of his lubricating oil for safe service. This is accomplished in the manner shown in Fig. 7 by positioning the temperature indicating device or pointer 90 in close proximity to and immediately in front of the viscosity indicating segment or dial 65, and providing the dial with arbitrary maximum and minimum allowable viscosity-temperature curves 95 and 96 respectively, to which the viscosity and temperature indications may be readily compared or referred. It will be understood that for any existing temperature as indicated by the pointer 90 there is a maximum and a minimum viscosity indicated by the respective curves between which the viscosity of the oil must be maintained for safe operation, or, conversely, for any given viscosity, the temperature of the oil must be maintained between predetermined limits as defined by the respective standard curves. For instance, the viscosity indication shown in Fig. 7 as approximately 2½, is suitable for operation between temperature conditions ranging from approximately 30° to somewhat in excess of 150°. Beyond 150° the oil is too viscous or heavy for satisfactory use, and below 30° is too light for suitable operation. Thus, with the construction and arrangement of the instrument, as described, the operator may readily observe the relative condition or suitability of the lubricating oil for service, the condition of the oil being satisfactory for use so long as the temperature indicating pointer 90 lies within the zone defined by the maximum and minimum standard curves and being unsuitable for service whenever the pointer crosses these curves and extends beyond what might be termed the "safe zone". In order that the suitability or condition of the oil may be readily observable, the zones above and below the respective maximum and minimum standard curves may be appropriately colored in red to indicate danger, while the intermediate "safe zone" may be white, indicating safety. Furthermore, a suitable temperature scale 97 may be provided upon the face plate 64 so that the operator may determine the actual temperature of the lubricating system. For convenience, the legends "Danger", "Normal" and "Cold" may be appropriately marked on the face plate 64 to indicate generally the corresponding temperature conditions.

Of course, if desired, the standard curves may indicate fluidity, the reciprocal relation to viscosity. Furthermore, by providing suitable curves the instrument may be used in the laboratory for a variety of purposes. For instance, a series of predetermined curves may be employed upon the segment 65 to enable oils or other fluids being tested to be readily graded in accordance with their viscosity, or, if desired, dilution curves may be employed through the agency of which the percentage of dilution of oils or fluids of known original viscosity may be readily determined.

In some instances, particularly when the device is used for laboratory purposes, it may be found desirable to secure direct readings of viscosity and temperature, and in Figs. 10 and 11 an instrument so arranged is illustrated. With reference to these figures, this modified form of a device has its face plate 64 provided with a plurality of openings 100 and 101 through which viscosity and temperature scales 102 and 103 respectively, are visible. The viscosity scale is carried by a movable segment 65 in the same manner as already described, and the viscosity readings are determined with relation to a fixed arrow 104. A mark 104ª on the segment indicates a viscosity beyond which it is unsafe to use engine lubricating oil, irrespective of its temperature. The temperature scale 103 is in the form of a sector fixed to a pin 105, which also is provided with an arm 106. The outer end of this arm is connected to an arm 107 by a link 108, and the arm 107 is mechanically associated with the pinion 85, which meshes with the rack 82 in the manner already set forth. An arrow 109 is utilized to determine the temperature readings.

When the device is used as a laboratory instrument, any suitable mode of introducing the fluid to be tested may be used, but when used to test the condition of the fluid in a circulating system, and particularly the lubricating oil of an automobile or other engine or machine, special provision is made for supplying and subsequently discharging the oil to be tested. In the form of the apparatus specifically illustrated in which the device is adapted to be connected to a fluid circulating system in the manner described in connection with Fig. 9, the device is provided with chambers 110 and 111 to which the supply and discharge pipes 22 and 23 are respectively connected. Referring particularly to Fig. 8, the inlet chamber 110 is provided with a port 112 having a valve 113 co-operating therewith to control the supply of fluid to the device. This port also communicates with a chamber 114 which opens into the fluid container within the inner cylindrical member 38. The valve 113 is carried at the end of a slidable valve 115 which is provided with a handle or button 1 by which the valve may be manually operated, the valve being normally biased to its closed position by means of a coil spring 116 which is interposed by a part of the casing 117 and a collar 118 fixed to the valve rod 115. The outlet chamber 111 (Fig. 1) to which the discharge pipe 23 is connected, communicates in a similar manner to the interior of the inner cylindrical member 38 and is provided with a valve rod and biasing spring in a similar manner, the valve rod being provided with a handle or button 3 by which the operation of the valve may be controlled. In order to insure the maintenance of a predetermined liquid level within the instrument during operation, an overflow port 120 is provided in the intermediate wall 34 and communicates through a passage 121 with the outlet chamber 111, so that any excess fluid may be overflowed and discharged through the pipe 23.

When used on an automobile, it may be found desirable to make provision whereby the instrument may be idle normally but may be thrown into operation when desired. To accomplish this end, a form of clutch is employed in the driving connection from the source of power to the outer rotatable cylindrical member 39, and this clutch may conveniently comprise the co-operating bevel gears 54 and 55 which may be engaged and disengaged under the control of the operator. Referring particularly to Fig. 1, this may be effected by longitudinally sliding the shaft 56 with its attached bevel gear 55 through the agency of a yoke or shifter 125 attached to the end of a rod 126 having at its forward end a handle or button 2. This clutch is normally maintained in its disengaged position, as illustrated in Fig. 1, by means of a biasing spring arranged in the manner of the corresponding springs already described with respect to the controllable inlet and outlet valves.

The device is so arranged that at all times the pressure of the lubricating system is suitably indicated to the operator. For this purpose, the pressure gauge 85ª (Figs. 6 and 8) of any well-known form is employed and is conveniently connected by a passage 131 with the inlet chamber 110, so that oil is always supplied thereto. This gauge 85ª has its extremity pivotally connected to a pivotally mounted geared sector 132 which meshes with a pinion 133, mechanically connected to a pointer 134 located on the forward side of the face plate 64 and in co-operative relation with a suitable pressure scale 135.

Although it is not essential, it is desirable, particularly when the device is used on an automobile, to so mechanically interlock the controllable supply and discharge valves and driving clutch as to insure the proper operation of the device when tests are being conducted. A slidable interlocking plate 135ª (Figs. 4 and 5) is therefore utilized, and is provided with a plurality of openings 136 through which the valve control rods 115 and the clutch control rod 126 loosely project. The plate 135ª is maintained in position between guiding lugs 137, forming parts of the casing. Each of the control rods above referred to is provided with an interlocking cone 138 fixed thereon in such a position as to be engaged by the locking plate 135ª, as shown particularly in Figs. 4 and 5, in which the several control rods are illustrated in their normal or idle positions, it being noted that the operating button 3 of the control rod associated with the outlet valve occupies its outer position in which it is held by the interlocking plate 135ª. This plate is maintained by a spring 139 in such position as to be engaged by the shoulder of the locking cone 138. Thus, the outlet valve is normally in its open position to permit the fluid container to be drained of its contents.

In order to test the condition of the lubricating oil the driver or operator first pulls out the control button 1 to open the inlet port and permit oil to be supplied from the lubricating system to the device. In pulling out the button 1 the locking cone 138 associated therewith serves as a cam to force the interlocking plate 135ª transversely, which movement releases the control rod of the outlet valve, whereupon the biasing spring 116 associated therewith effects the closure of the valve, thereby preventing any further discharge of the contents of the container. The pull button 1 is held out momentarily to permit the spring 139 to return the interlocking plate 135ª to its initial locking positon, after which the button may be released and is held or locked in its outer position by the engagement of the interlocking plate 135ª with the shoulder of the locking cone 138, to which the button 1 is connected.

Before making an actual reading of the viscosity, the oil should be allowed to flow through the instrument for a short period until the temperature indicator 90 has reached a constant position thereby indicating that the entire instrument has reached the temperature of the oil to be tested. During this continuous supply of oil to the instrument, the excess oil overflows through the overflow port 120 and is returned to the system through the discharge pipe 23. However, after having thus warmed up the instrument to substantially constant temperature conditions, the control button 2 is pulled out to effect the engagement of the driving clutch, which initiates the rotational movement of the outer cylindrical member 39. As the button 2 is pulled out, the cone 138 associated therewith performs the function of a cam and forces the interlocking plate 135ª transversely against the action of the biasing spring 139. As soon as the interlocking plate has reached its extreme position, the inlet valve, which has previously been locked in its open position by the cooperative engagement of the interlocking plate and its locking cone, is immediately released and closed by its biasing spring 116, thereby cutting off the further supply of oil to the instrument.

The instrument, now being filled with a sample of the lubricating oil taken directly from the circulating system, is in readiness to determine the viscosity and temperature thereof, provided the proper speed of operation is maintained as has been hereinbefore set forth. Assuming that the proper speed conditions obtain, the instrument will indicate the viscosity of the oil, together with its temperature in the manner already set forth.

As soon as the test has been completed, pull button 3 associated with the outlet valve, is pulled out thereby opening the discharge port and permitting the oil within the casing to be drained into the lubricating system through the discharge pipe 23. At the same time the opening of the outlet valve through the cam action of its associated locking cone upon the interlocking plate 135ª, effects the release of the driving clutch, whereupon the instrument is disconnected from the source of power and is rendered idle.

As has already been intimated, the interlocking feature may be dispensed with, if desired, and the control valves and clutch operated independently. In such a case, it is possible by proper manipulation of the pull buttons to cause the oil from the lubricating system to be continuously circulated through the instrument during the period that the test is made. This may be accomplished by opening the inlet valve and closing the outlet valve, whereupon oil is supplied to the fluid container through the inlet opening 114 at the bottom of the device, and is discharged continuously through the overflow port 120 and thence returned to the system. It may, in certain cases, be even found desirable to so adjust the instrument as to permit the oil to be circulated therethrough continuously, even when no tests are being made.

When the device is used for laboratory purposes, any source of power may be utilized for driving the rotatable cylindrical member 39, and although the sample of fluid to be tested may be introduced and subsequently withdrawn from the container in the manner already set forth, it may equally well be poured into the container manually or introduced in any other way. For ordinary laboratory purposes, the device will be provided with direct reading indicators, as illustrated in Figs. 10 and 11, although the form illustrated in Fig. 7, or certain modifications thereof, may be found useful in making laboratory determinations.

Referring to Figs. 12 and 13, the modified embodiment of the invention as illustrated, is constructed in general as already described, but embodies an automatic speed regulating device or governor which functions to maintain the speed of operation of the rotatable cylindrical member 39 substantially constant throughout a wide range of speed variations of the driving shaft 56. In accordance with this aspect of the invention, the driving shaft 56 carries a friction driving wheel 141 which is engaged by a co-operating friction wheel 142 forming a part of the pinion 50 which meshes with the annular gear 49 of the rotatable cylinder 39. This friction wheel 142 is carried by the shaft 51, the respective ends of which have suitable bearings 143 and 144 in the casing. The friction wheel 142 is keyed loosely to the shaft 51 in such manner as to permit vertical movements thereof and is provided with an elongated sleeve 146 which surrounds the shaft and which carries at its upper end an enlarged member or spool 147, having oppositely sloped end or cam portions 148 and 149 and an intermediate vertical portion 150. The sleeve 146 is provided intermediate its ends with a bushing 152, which is restrained against vertical movement but is free to rotate in a bearing provided in a projecting lug 153 forming a part of the casing. Between the bushing 152 and the upper spool 147, a plurality of weights 155 are suspended upon flexible members 156 in the manner of the usual fly-ball governor.

With this construction, it will be understood that as the speed of the shaft 56 is increased beyond a predetermined amount, the weights 155 will be thrown outwardly by centrifugal force, and inasmuch as the bushing 152 is restrained against vertical movement, the spool 147, the sleeve 146 and the friction wheel 142 will necessarily be pulled downwardly. This action will result in bringing the point of contact of the friction wheel 142 nearer the center of the friction driving wheel 141, thereby automatically decreasing the speed of the shaft 51 and, consequently, of the rotary cylinder 39. Similarly, decreases in the rotational speed of the shaft 156 will tend to raise the friction wheel 142 toward the periphery of the friction driving wheel 141, thereby effecting corresponding increases in the speed of rotation of the outer cylinder 39. In this manner compensations are automatically effected for variations in speed conditions and a substantially constant speed, within limits, is maintained. So long as the device maintains this substantially constant speed, the instrument is permitted to operate to indicate the viscosity of the oil being tested, but if the speed should fall below or rise above the predetermined range of operable speeds, means is provided for automatically locking the viscosity-indicating mechanism against operation.

This is accomplished by means of a pin or locking pawl 158, which is slidably mounted in a lug 159 projecting downwardly from the upper wall of the casing. One end of this pin is adapted to cooperatively engage the teeth 68 provided in the hub portion of the arm 63, while the other end thereof is maintained in frictional engagement with the spool 147 by means of a coil spring 160 that surrounds the pin and is disposed between the lug 159 and a collar 162 on the pin. So long as the speed of operation is regulated between the predetermined limits, the pin 158 engages the vertical portion 150 of the spool 147, in which event the viscosity-indicating mechanism is free to operate. However, should the speed become excessive or be reduced below the limited range, the inclined portions 148 or 149 are caused to effect a cam action on the pin 158 and force it into locking engagement with the teeth 68, thereby arresting the operation of the indicating mechanism.

In Fig. 14 is illustrated a portable testing set which is so constructed and arranged as to be conveniently transported from place to place and utilized to test fluid within any container or receptacle, thereby obviating the necessity of carrying a sample of the fluid to be tested to the laboratory for the determination of its viscosity. The testing set is shown as resting upon a receptacle 165 containing the fluid to be tested, and comprises a supporting frame 166 upon which is mounted a viscosimeter $20_a$, a source of power in the form of an electric motor $27_a$ and a rotray pump $26_a$. A suitable source of an electric energy is employed for operating the motor and a switch 167 is provided for connecting and disconnecting the motor to and from the source. The motor $27_a$ and the rotary pump $26_a$ may be of any suitable construction, and while the viscosimeter $20_a$ is preferably of the type hereinbefore described, any viscosimeter that is adapted to determine the viscosity of a fluid flowing through it may be utilized. If the type of viscosimeter hereinbefore set forth be employed, the rotary cylinder 39 thereof is connected to and operated by the motor shaft $28_a$, which is also connected to the pump $26_a$. Supply and discharge pipe connections $22_a$, $22_b$ and $23_a$, having valves 168 therein, are provided and so positioned as to be introduced into the receptacle and the fluid contained therein. The inlet pipe $22_a$ is connected to the rotary pump $26_a$ and a continuation $22_b$ of said inlet pipe is utilized to deliver the fluid from the pump to the viscosimeter. In order to test the viscosity of any fluid within any receptacle, it is only necessary to position the portable testing set as illustrated and start the motor $27_a$ into operation. The fluid will then be pumped continuously through pipe connections 22$_a$ and 22$_b$ to the viscosimeter and thence returned to the receptacle through the discharge pipe connection 23$_a$, the viscosity of the fluid being tested in transit through the instrument. Instead of continuously circulating the fluid through the viscosimeter the valves 168 may be manipulated so that the instrument is merely filled with the fluid to be tested.

From the foregoing description it will readily be seen that the space 40 between the cylinders 38 and 39 is either known or readily determinable and constant, that the rate of rotation of the cylinder 39 is known and constant, and that the effective area of the surface of the inner cylinder is both constant and either known or readily determinable. Thus all of the factors, except that of force, necessary to compute the absolute viscosity of the liquid under test are both known and constant. The force is the only unknown and variable factor and it follows that the mathematical determination of the absolute viscosity must vary as the force varies.

The force is measured by means of the spring 60 which is or has been tested and compared with a spring of known tension. The pull on the spring caused by the movement of the inner cylinder actuates the arm 63 so as to indicate upon the dial 64 the amount of movement of the cylinder. The arm 63 will be moved to a greater or less extent in exact proportion to the viscosity of the liquid being tested. The dial is so calibrated that the deflection of the arm 63 indicates directly the absolute viscosity of the liquid in poises or in centipoises, which are the standard units of absolute viscosity. Of course, if preferred, the dial can be graduated so that the force will be indicated in dynes per square centimeter from which the absolute viscosity can then be readily figured but it is generally more desirable to calibrate the scale so that the force in dynes will be translated directly into either poises or centipoises.

Having set forth the nature and scope of the invention, what is claimed as new is:

1. In a fluid testing device the combination of a container for the fluid to be tested, a plurality of concentrically disposed cylindrical rotatable members immersed in the fluid and having a relatively thin film of fluid interposed between their adjacent cylindrical surfaces, and means for rotating one of said members to cause the other of said members to be deflected in proportion to the viscosity of the intermediate fluid film.

2. In a fluid testing device the combination of a container for the fluid to be tested, a plurality of concentrically disposed cylindrical rotatable members immersed in the fluid and having a relatively thin film of fluid interposed between their adjacent cylindrical surfaces, means for rotating one of said members to cause the other of said members to be deflected in proportion to the viscosity of the intermediate fluid film, and means responsive to the deflecting movement of the second member for visibly indicating the viscosity determination.

3. In a fluid testing device the combination of a container for the fluid to be tested, a plurality of hollow cylindrical rotatable members disposed in concentric relation and immersed in the body of fluid in such manner that a thin film of fluid is interposed between the adjacent cylindrical surfaces thereof, means for rotating one of said members whereby rotatable movement is imparted to the other of said members through the film of fluid and in accordance with the viscosity thereof, means tending to oppose the rotative movements of the second member, and means for causing the deflection of said second member to visibly indicate the viscosity of the fluid being tested.

4. In a fluid testing device the combination of a container for the fluid to be tested, an open-ended hollow cylindrical member resting on the bottom of the container and adapted for rotative movements, a second open-ended hollow cylindrical member disposed within said member in concentric relation and pivotally mounted for rotative movements, the adjacent cylindrical surfaces of said members being slightly spaced apart to receive a thin film of fluid, means for rotating the outer cylindrical member at a substantially constant speed whereby the inner cylindrical member is rotatably deflected in accordance with the viscosity of the film of fluid, means tending to oppose the deflection of said inner cylindrical member, and means associated with said member for visibly indicating its deflection and, therefore, the viscosity of the fluid being tested.

5. In a fluid testing device the combination of a container for fluid to be tested, means disposed within the container and immersed in the fluid for indicating the viscosity thereof, separate means for supplying fluid to said container and for discharging it therefrom, and controllable means for governing said supply means and said discharge means, and an overflow connection communicating with said discharge means and serving to maintain a uniform fluid level in said container.

6. In a fluid testing device the combination of a stationary container for fluid to be tested, means including a plurality of rotatable hollow cylindrical members disposed in concentric relation and immersed in the fluid for visibly measuring the viscosity thereof, and means responsive to the temperature of the fluid within the inner cylindrical member for measuring the temperature thereof.

7. In a fluid testing device the combination of a stationary container for fluid to be tested, means immersed in the fluid and constructed and arranged to determine the viscosity thereof, a second means immersed in the fluid and responsive to the temperature thereof, and plural means associated with said respective means for independently indicating the viscosity and temperature of the fluid being tested.

8. In a fluid testing device the combination of a stationary container for fluid to be tested, means including a hollow rotatable member immersed in the fluid for determining its viscosity, and means immersed in the fluid within said hollow rotatable member and operable during the rotation thereof for measuring the temperature of the fluid contained therein.

9. In a fluid testing device the combination of a container for fluid to be tested, means disposed within the container and including a rotatable member for measuring the viscosity of the fluid, means for rotating said rotatable member, and means dependent upon the speed of rotation thereof for controlling the operation of said measuring means.

10. In a fluid testing device, the combination of a container for fluid to be tested, a rotatable member disposed in said container and immersed in the fluid therein, means in cooperative relation with said rotatable member for measuring the viscosity of the fluid being tested, means for rotating said rotatable member, and means for permitting the operation of said measuring means only when the speed of rotation of said member is within a predetermined range.

11. In a fluid testing device, the combination of a container for fluid to be tested, a rotatable member disposed in said container and immersed in the fluid therein, means in cooperative relation with said rotatable member for indicating the viscosity of the fluid being tested, means for rotating said rotatable member, and speed-responsive means for rendering said indicating means operative only under predetermined speed conditions of said rotatable member.

12. In a fluid testing device the combination of a container for fluid to be tested, means disposed within the container and including a rotatable member for measuring the viscosity of the fluid, means for rotating said rotatable member, and means responsive to the speed of rotation of said rotatable member for automatically maintaining said rotational speed substantially constant.

13. In a fluid testing device the combination of a container for fluid to be tested, means disposed within the container and including a rotatable member for measuring the viscosity of the fluid, means for rotating said rotatable member, and automatic means responsive to the speed of rotation of said rotatable member for maintaining the rotational speed substantially constant within limits and rendering said measuring means operative only under predetermined speed conditions.

14. In a fluid testing device the combination of a container for the fluid to be tested, a plurality of hollow cylindrical members rotatably disposed in concentric relation and immersed in the fluid within the container, means for rotating one of said cylindrical members whereby rotational movements are imparted to the other cylindrical member in accordance with the viscosity of the fluid film interposed between the cylindrical surfaces, means responsive to the deflection of said second cylindrical member and constructed and arranged to visibly indicate the viscosity of the film of fluid, and means dependent upon the speed of rotation of said first cylindrical member for permitting the operation of said second cylindrical member only when said speed of rotation is within a predetermined range.

15. In a fluid testing device the combination of a stationary container for fluid to be tested, means within the container including a rotatable member for determining the viscosity of the fluid, driving means for rotating said rotatable member, a fluid connection to said container, controllable devices in said driving means and said fluid connection, and means for mechanically interlocking said controllable means.

16. In a fluid testing device the combination of a stationary container for fluid to be tested, means disposed within said container and immersed in the fluid therein for determining the viscosity of the fluid, a fluid supply connection, a fluid discharge connection, controllable devices in said fluid connections, and means for mechanically interlocking said controllable devices.

17. In a fluid testing device the combination of a stationary container for fluid to be tested, a plurality of rotatable members adapted to be immersed in the fluid therein and constructed and arranged to determine the viscosity thereof, driving means for rotating one of said members, a fluid supply connection, a fluid discharge connection, controllable devices in said fluid connections, a controllable device in said driving means, and interlocking means associated with said controllable devices for causing the operation of any one of said controllable devices to effect predetermined operations of the remaining controllable devices.

18. In a fluid testing device the combination of a stationary container for fluid to be tested, a plurality of rotatable cylindrical members disposed in concentric relation and immersed in the fluid driving connection for rotating one of said members to cause the other member to be deflected in accordance with the viscosity of the fluid film between the cylindrical surfaces thereof, a fluid supply connection, a fluid discharge connection, controllable valves in said supply and discharge connections, a controllable clutch in said driving connection, and interlocking means associated with said controllable valves and clutch to insure a predetermined relative operation thereof.

19. A fluid testing device having in combination a container for the fluid to be tested, means disposed within the container for measuring the viscosity of the fluid, means for visibly indicating the measured viscosity, a temperature responsive means for indicating the temperature of the fluid at a point adjacent the viscosity indications, and means including a member having a predetermined standard viscosity temperature curve associated with the viscosity indicating means and in cooperative relation with said temperature indicating means for bringing the viscosity and temperature indications into a comparative relation with said standard viscosity-temperature curve.

20. A fluid testing device having in combination a container for the fluid to be tested, means disposed within the container for measuring the viscosity of the fluid, means for visibly indicating the measured viscosity, a temperature responsive means for measuring and indicating the temperature of the fluid, and a scale carried by said viscosity indicating means and provided with a predetermined viscosity-temperature curve movable thereby in cooperative relation with said temperature indicating means to enable a comparison of the measured viscosity and temperature with a predetermined standard.

21. A fluid testing device having in combination a container for the fluid to be tested, means disposed within the container for measuring the viscosity of the fluid, means for visibly indicating the measured viscosity, a temperature responsive means for measuring and indicating the temperature of the fluid, a scale carried by the viscosity indicating means and marked with a predetermined standard viscosity-temperature curve with which the measured viscosity and temperature may be compared.

22. A fluid testing device having in combination a container for the fluid to be tested, means disposed within the container for measuring the viscosity of the fluid, means for visibly indicating the measured viscosity, a temperature responsive means for measuring and indicating the temperature of the fluid, a scale carried by the viscosity indicating means and provided with a plurality of predetermined standard viscosity-temperature curves with which the indicated viscosity and temperature may be compared.

23. In apparatus for testing fluids the combination of a container for fluid to be tested, means disposed within container for determining and indicating the viscosity of the fluid, means for indicating the temperature of the fluid, and means carried by said viscosity-indicating means and provided with standard viscosity-temperature curves in spaced relation for indicating the safe temperature thereof.

24. In apparatus for testing fluids the combination of a container for fluid to be tested, means disposed within container for determining and indicating the viscosity of the fluid, means for indicating the temperature of the fluid, and means carried by said viscosity-indicating means and provided with standard viscosity-temperature curves in spaced relation for indicating both the safe viscosity and the safe temperature thereof.

25. In a fluid testing device the combination of a container for the fluid to be tested, means disposed within the container for determining the viscosity of the fluid therein, an inlet connection at the bottom of said container, an overflow connection at a predetermined height therein, and means for continuously passing oil into the inlet connection through the container and discharging it through said overflow connection.

26. In a fluid testing device the combination of a container for the fluid to be tested, a plurality of rotatable cylindrical members disposed within the container in concentric relation and immersed in the fluid therein, a thin film of fluid being maintained between the adjacent cylindrical surfaces thereof, means for rotating one of said members to cause the other member to be deflected in accordance with the viscosity of the intermediate fluid film, means for continuously introducing fluid into the bottom of said container and within the inner cylindrical member and discharging it from the upper portion of said container.

27. In apparatus for testing fluids under conditions of use, the combination of a fluid circulating system, a viscosimeter, and controllable connections between said system and said viscosimeter for delivering fluid thereto to be tested and for subsequently returning the fluid to the circulating system.

28. In apparatus for testing fluids under conditions of use, the combination of a fluid circulating system, a viscosimeter, means associated therewith for determining the temperature of the fluid and controllable means connecting said system and said viscosimeter for supplying fluid from said system to said meter and for subsequently returning the fluid to the circulating system.

29. In apparatus for testing fluids under conditions of use, the combination of a fluid circulating system, a unitary testing device constructed and arranged to indicate the viscosity, temperature and pressure of the fluid to be tested, and controllable means interposed between said device and said system for delivery the fluid from said system to the testing device and for subsequently returning the oil from the testing device to the circulating system.

30. In apparatus for use on an automobile for testing the condition of the crank case oil, the combination of an automobile engine having crank case containing lubricating oil, a pump for circulating the oil through the engine lubricating system, a viscosimeter, a connection between the crank case and the viscosimeter, and means under the control of the operator for opening the connection to permit said pump to deliver oil to be tested directly from said crank case to said meter.

31. In apparatus for use on an automobile for testing the condition of the crank case oil, the combination of an automobile engine having a crank case containing lubricating oil, a pump for circulating the oil through the engine lubricating system, a viscosimeter, a supply connection and a discharge connection between said crank case and said viscosimeter, and means controllable by the operator for opening the supply connection to cause oil to be delivered to said meter and for opening the discharge connection to permit the oil in said meter to be discharged into the crank case.

32. In apparatus for use on an automobile for testing the condition of the crank case oil, the combination of an automobile engine having a crank case, a lubricating system for the engine including an oil pump, a gear set, a viscosimeter including a rotatable member immersed in the oil to be tested, controllable mechanical means connecting said gear set with the rotatable member of said viscosimeter and controllable oil conducting means for connecting the viscosimeter with the engine crank case.

33. In apparatus for use on an automobile for testing the condition of the crank case oil, the combination of an automobile engine having a crank case, an engine lubricating system including an oil pump, a gear set, a viscosimeter including a rotatable member immersed in the oil to be tested, a mechanical driving connection between said rotatable member and said gear set, oil supply and discharge connections between said crank case and said viscosimeter, controllable means disposed in said driving connection and said oil connections, and interlocking means associated with said controllable means for insuring a predetermined operation thereof.

34. Apparatus for testing liquid comprising a pair of spaced concentrically disposed movable members having the space between them filled with the liquid under test, means for rotating one of said members at a constant rate of speed, means for opposing any movement of the other member due to the frictional resistance of the film of liquid between the members, means for indicating any movement of the second member against the force of the opposing member, and means for indicating the force exerted in opposing the movement of said member.

35. Apparatus for measuring directly the absolute viscosity of a liquid comprising a pair of spaced concentrically disposed cylinders having the space between them filled with the liquid under test, means for rotating one of said cylinders at a constant speed, resilient means for opposing any rotative movement of the other cylinder due to the frictional resistance of the liquid between the cylinders, and means cooperating with said resilient means for indicating the absolute viscosity of the liquid upon a calibrated dial.

36. Apparatus for measuring the absolute viscosity of a liquid comprising a member of known effective area which is adapted to be moved at a constant rate of speed, a second member of known effective area spaced at a known distance from the first member, the space between said members being constant and occupied by the liquid under test, means for moving the first named member at a constant speed, resilient means cooperating with the second named member for opposing any movement thereof due to the frictional resistance of the liquid, and means for indicating the viscosity of the liquid upon a calibrated dial.

In witness whereof, the said WILLIAM F. OSBORNE, hereunto set his hand this 12 day of July, 1921.

WILLIAM F. OSBORNE.